United States Patent Office 3,600,248
Patented Aug. 17, 1971

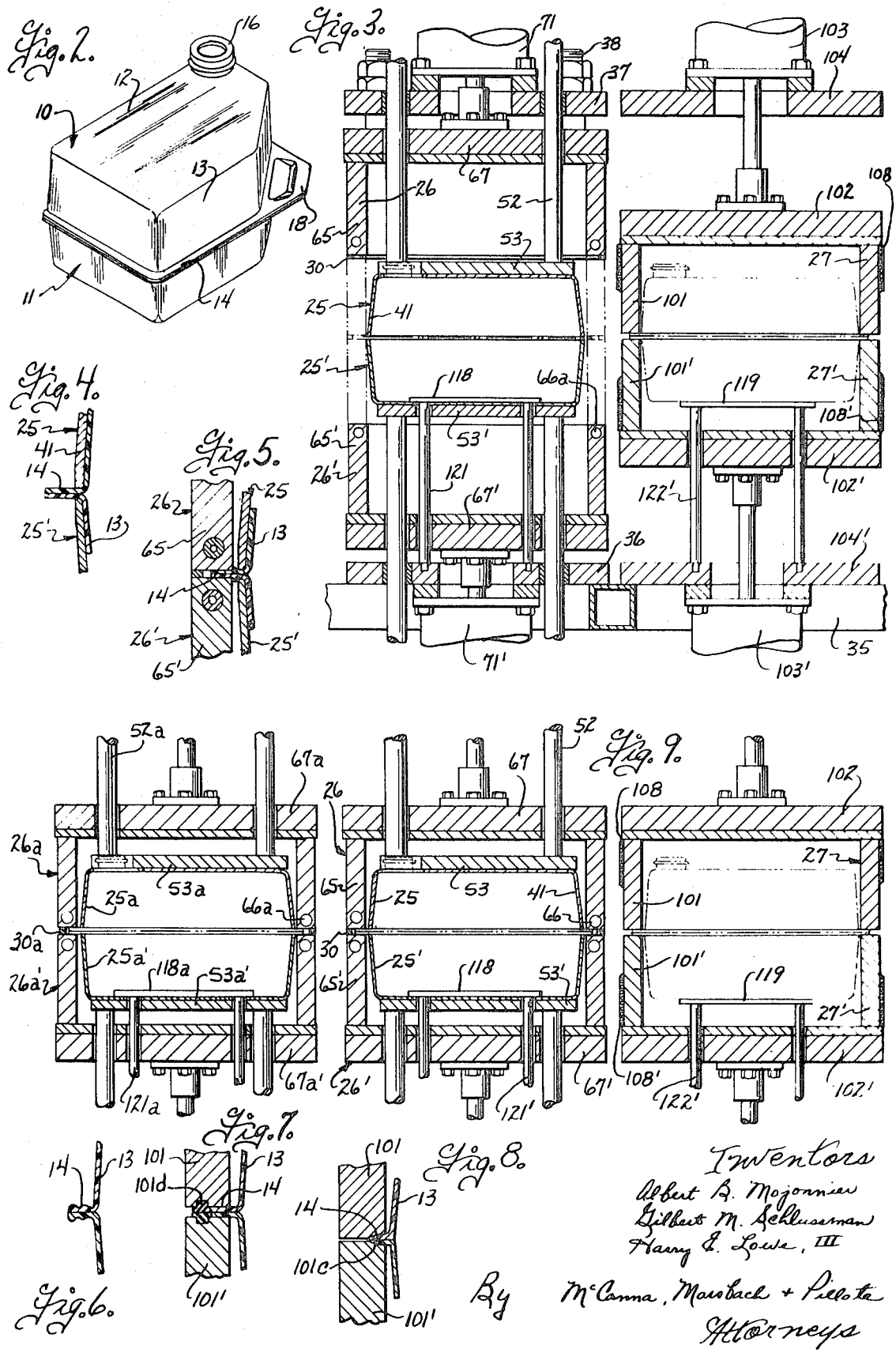

3,600,248
METHOD FOR HEAT SEALING THERMOPLASTIC BODIES
Albert B. Mojonnier, Chicago, Ill., and Gilbert M. Schlussman, Ironia, and Harry E. Lowe III, Martinsville, N.J., assignors to Albert Mojonnier, Inc.
Filed July 13, 1966, Ser. No. 564,842
Int. Cl. B29c 27/00; B65b 7/28
U.S. Cl. 156—69              6 Claims

ABSTRACT OF THE DISCLOSURE

A method of joining two thermoplastic polyethylene bodies having overlapping portions, in which the overlapping portions are heat softened by engaging and disengaging the same at least twice in succession between heating jaws heated to a preferably high temperature in the range 500°–1000° F., and the heat softened overlapping portions are thereafter cooled by engaging the same between cool sealing jaws with sufficient pressure to bring the overlapping portions into intimate contact.

This invention relates to a method for heat seal joining of thermoplastic bodies and an apparatus for practicing the method.

Various different arrangements have heretofore been devised for heat seal joining of thermoplastic bodies, some of which directly heat the mating surfaces of the thermoplastic body, as by contacting the mating surfaces with a hot plate or flame. Some other heat sealing apparatus use induction heating to heat the overlapping portions of the thermoplastic bodies while still others indirectly heat the mating surfaces by application of heat to the outer surfaces of the overlapping portions. The present invention is directed to a method of heat sealing overlapping portions of thermoplastic bodies through the application of heat to the outer surfaces of the overlapping portions.

In order to effect a heat seal between the overlapping portions, the mating surfaces must be heated at least sufficient to soften the same and, when the heat seal is accomplished by application of heat to the outer surfaces of the overlapping portions, this heat must be conducted through the overlapping portions to the mating surfaces. However, most thermoplastics are relatively poor heat conductors so that the problem of heating the mating surfaces increases markedly as the thickness of the thermoplastic bodies is increased above that of relatively thin films having a nominal thickness of no more than .010 inch. Moreover, because the heating of the mating surfaces in this arrangement is by conduction through the overlapping portions, it is apparent that any variation in thickness of the overlapping portions, such as frequently occurs in the flanges of formed thermoplastic bodies, will aggravate the problem of uniformly heating the mating surfaces as well as the problem of maintaining a uniform sealing pressure on the overlapping portions. Further, the thermoplastic material becomes tacky when heated above its softening temperature and this raises problems as regards sticking and build-up of the thermoplastic material on the heat sealing member. If the thermoplastic material is heated to too high a temperature, problems are encountered with degradation of the material.

An important object of this invention is to provide a method for heat sealing overlapping portions of thermoplastic bodies which provides a uniformly strong and durable heat sealed joint therebetween.

Another object of this invention is to provide a method for heat sealing thermoplastic bodies which enables production of a heat sealed joint having improved shape and appearance.

Yet another object of this invention is to provide a method for heat sealing thermoplastic bodies which will provide a uniform heat sealed joint notwithstanding variations in the thickness of the overlapping portions of the thermoplastic bodies.

Still another object of this invention is to provide a method for heat seal joining of thermoplastic bodies which enables formation of the heat sealed joints at high speeds.

A further object of this invention is to provide an improved method of heat seal joining of thermoplastic bodies using heated jaws and which efficiently avoids sticking and build-up of thermoplastic material on the heated jaws.

Those, together with other objects and advantages of this invention, will be more readily appreciated as the invention becomes better understood by reference to the following detailed description, when taken in connection with the accompanying drawings, wherein:

FIG. 2 is a perspective view of a container of a type adapted to be sealed by the method and apparatus of the present invention;

FIG. 3 is a fragmentary sectional view through the heat sealing apparatus illustrating the apparatus in different moved positions incident to the joining of the thermoplastic bodies;

FIGS. 4 and 5 are fragmentary views on an enlarged scale, illustrating the clamping of the thermoplastic bodies between cold jaws and the subsequent heating of the mating flanges on the thermoplastic bodies;

FIG. 6 is a fragmentary view on an enlarged scale illustrating a typical flange shape after heating and before compression molding of the flange;

FIGS. 7 and 8 are fragmentary views on an enlarged scale, illustrating modified forms of shaping jaws; and FIG. 9 is a fragmentary sectional view through a modified form of apparatus wherein heating of the thermoplastic bodies is effected at at least several different stations.

Figure 1:
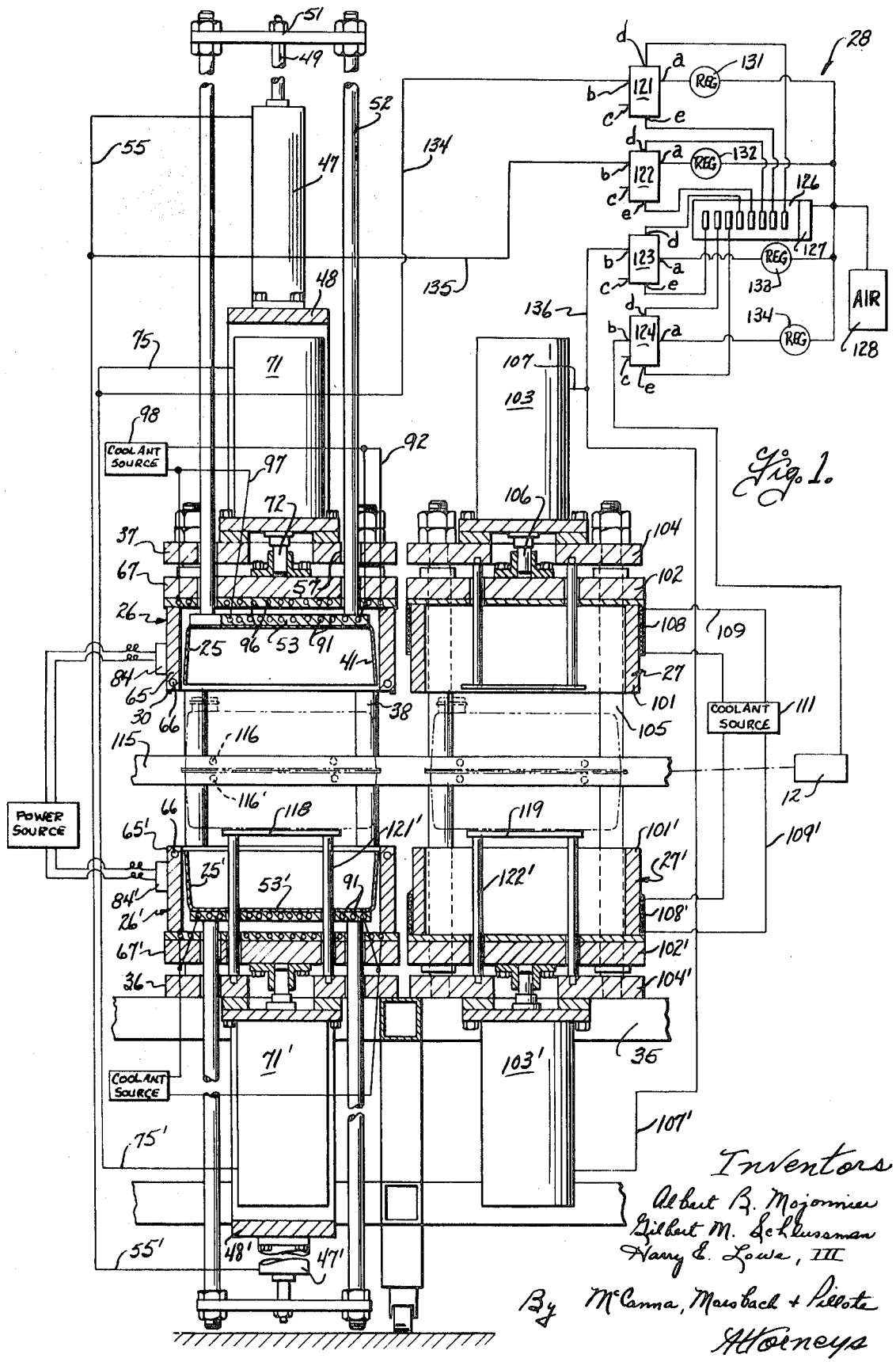
FIG. 1 is a view shown partially in section and partially diagrammatically, of an apparatus for performing the method of the present invention.

The method and apparatus of the present invention is adapted for heat seal joining of thermoplastic bodies formed of polyethylene and particularly high density polyethylene. While the method can be employed to heat seal thermoplastic bodies formed of relatively thin "film" material having a thickness of .010 inch or less, it is most advantageously employed in conjunction with heat seal joining of relatively thicker thermoplastic bodies, that is, bodies having a thickness greater than .010 inch. The hear sealing method and apparatus of the present invention provides a heat sealed joint of improved appearance and, while the method and apparatus can be employed in heat seal joining of thermoplastic bodies of widely different configuration, it is particularly adapted for heat seal joining of preformed cup-shaped bodies along mating marginal edge portions thereof to form containers. The preformed bodies may be formed from sheet material in any suitable manner, as by die forming between mating dies; drape forming; pressure or vacuum forming, etc. A container of the type adapted to be heat seal joined by the present invention is shown in FIG. 2 and comprises first and second cup-shaped bodies designated 10 and 11, each having face panels 12, marginal side walls 13 and mating peripheral flanges 14 which extend outwardly from the respective side wall. The cup-like bodies 10 and 11 are adapted to be joined together along the mating flanges 14 to form a container and the container is provided with a spout opening designated 16 to enable filling of the container after the bodies are joined together and also to enable dispensing of the contents from the container. The particular container shown herein also includes a handle portion 18 formed in the flanges 14 adjacent one corner of the container.

In the heat seal joining of thermoplastic bodies by application of heat to the outer surfaces of the overlapping portions, it has heretofore been the general practice to use relatively low temperatures and relatively high pressures during heating with the heat being applied for the minimum time required to effect heat seal joining at those temperatures and pressures. The low temperatures were generally deemed necessary to minimize distortion and shrinkage of the thermoplastic bodies which occurs at higher temperatures and to also minimize melting of the outer surfaces of the thermoplastic bodies which tends to cause sticking of the thermoplastic to the heat sealing member. At the low heat sealing temperatures, for example in the range of 275–350° F. for polyethylene, it is necessary to use relatively high pressures in order to effect a satisfactory heat seal. Such prior heat sealing arrangements using relatively low temperatures were quite slow and, moreover, encountered difficulties particularly when the sections being heat sealed were not of uniform thickness. The non-uniform thickness frequently resulted in non-uniform heating of the mating surfaces and, moreover, made it difficult to maintain uniform pressure on the overlapping portions being heat sealed with the result that the heat seals were not always uniform and reliable. In accordance with the method of the present invention, the overlapping edge portions of the thermoplastic bodies are heated by heating jaws heated to a temperature substantially above the melting temperature of the thermoplastic and the heat softened portions thereafter pressed into intimate sealing contact by relatively cool jaws. For thermoplastic materials such as high density polyethylene, it has been found that markedly improved results are achieved if the sealing jaws are maintained at a temperature in the range of about 500° F. to 1000° F. More particularly, it has been found that using such high temperature heating jaws minimizes sealing time, avoids the necessity of critical heating times or jaw temperature controls in the heating cycle, accommodates thickness variations in the material, and prevents material accumulation on the heating jaws, while generally improving reliability and quality of the sealed joint. At these high temperatures, the heating jaws melt the outer surfaces of the overlapping portions of the thermoplastic bodies and thus compensate for any non-uniformity in the thickness of the overlapping portions. Further, the high temperature of the heating jaws produces a rapid melting and vaporization of any thermoplastic material that may adhere to the heating jaws when they are disengaged from the thermoplastic bodies, so as to thereby avoid accumulation or build-up of material on the heating jaws which would cause sticking in a subsequent heating cycle. The overall heating time required to heat soften the overlapping portions of the polyethylene bodies with heating jaws in this temperature range is relatively short and, moreover, the change in heating time with increases in jaw temperature above 500° is relatively low. Consequently, the heating jaws can be preset to close for a fixed cycle time, selected in accordance with the median jaw temperature to be maintained, and even moderate changes in heating time or in jaw temperature from this median in different heating cycles or even in different portions of the heating jaw will not prevent satisfactory heating of the thermoplastic.

High density polyethylene begins to melt at about 275° F. and changes from a translucent to a soft, relatively more transparent condition when heated above that temperature. However, the polyethylene has low heat conductivity, and some time is required for the heat applied to the outer surfaces to penetrate the thickness of the material.

As previously described, the high temperature heating jaws melt the outer surfaces of the overlapping portions of the bodies engaged by the jaws and control of the melting of the outer surfaces is achieved by limiting closing movement of the heating jaws to a spacing less than the combined thickness of the flanges so as to produce heat softened edge portions of generally uniform thickness. When the closing movement of the jaws is stopped, the pressure between the heating jaws and the overlapping portions of the thermoplastic bodies drop to a low value or even zero. It will thus be seen that the pressure applied to close the heating jaws is not critical as regards heating of the overlapping portions. However, it has been found that at the lower portion of the jaw temperature range, that is around 500–600°, the melting of the thermoplastic is slower than at higher temperatures and that it is preferable to use moderate jaw closing pressure, for example jaw closing forces which would provide a pressure of about 25 to 200 p.s.i. on the overlapping portions. It is considered that the higher jaw closing pressure enhances the initial melting of the outer surfaces on the relatively thicker portions of the flanges. At higher jaw temperatures, in the range 600° F. and above, melting of the thermoplastic occurs at a more rapid rate and low jaw closing pressures, for example 2–5 p.s.i. are adequate.

In order to effect reliable and consistent heat seals, it is necessary to press the heat softened portions into intimate contact. Because of the melting of the outer surfaces of the overlapping portions by the high temperature heating jaws and the limiting of closing movement of the jaws when the overlapping portions are partially melted, the heating jaws cannot alone be relied upon to press the heat softened flanges into sufficiently intimate contact for heat sealing. The flanges, after being heat softened in the heating jaws, are accordingly subsequently pressed into intimate sealing contact by cool sealing jaws. The pressure applied by the sealing jaws to the heat softened flanges to seal the same can be relatively low, for example 2–5 p.s.i. on the flanges, if the sealing flanges are shaped to engage only the heat softened portions of the thermoplastic. When the flanges are heated, the heat softened edge portions tend to shrink somewhat in the plane of the flanges and this produces some desirable lateral thickening of the heat softened portions. The subsequent clamping of the heat softened portions in the sealing jaws, even at relatively low jaw closing pressures of the order of 2–5 p.s.i., produces some flattening and reshaping of the flanges. However, improved shaping of the flanges can be achieved at relatively higher sealing jaw closing pressures. When low sealing jaw pressures of the order of 2–5 p.s.i. on the flanges are used, it is preferable to shape the sealing jaws so as to only engage the flange area that has been directly contacted and softened by the heating jaws. However, the heat applied to the flanges by the sealing jaws does transfer into adjacent areas of the flanges and produce some softening. If higher sealing pressures are available, the sealing jaws can be proportioned and shaped to engage the flanges both in the areas directly contacted by the heating jaws and in the areas inwardly thereof to reshape the entire flange.

The thermoplastic material vaporizes more rapidly at higher temperatures and at heating jaw temperatures around 600°–650° F. some "smoking" of polyethylene is noted. This smoking increases as the jaw temperature is increased above 650° F. and becomes very pronounced at the higher temperatures above 800° F. Further, there is some tendency to burn or degrade the outer surface of the thermoplastic at these higher temperatures and it is accordingly preferable to limit the heating jaw temperature to below 800° F. for polyethylene where appearance of the heat sealed flange is important. It is to be understood, however, that jaw temperatures above 800° F. can be used in applications where some degradation of the outer surface of the plastic is not a concern. It is considered that above 1000° F., the degradation of the plastic would be a very serious problem.

An apparatus suitable for practicing the method of the present invention is disclosed in the drawings and, in general, includes first and second heating jaws 26, 26' for engaging and heating the overlapping edge portions, and a pair of sealing jaws 27, 27' for clamping the heated overlapping portions to seal the same. An apparatus designated generally by the numeral 28 is provided for operating the heating and sealing jaws and for controlling the duration of the several cycles.

The heat sealing apparatus illustrated herein is an improvement in apparatus of the type disclosed in the patent to Mojonnier et al., No. 3,152,944 and particularly pertains to an apparatus of the type disclosed in the patent application of Albert B. Mojonnier for "Method and Apparatus for Heat Sealing Containers," Ser. No. 450,851, filed Apr. 26, 1965, now Patent No. 3,383,260. The heat sealing apparatus includes a stationary support structure herein shown including a base frame 35, a lower mounting plate 36, an upper mounting plate 37 supported in fixed relation to the lower plate 36 as by standards or rods 38. The portions of the thermoplastic bodies inwardly of the marginal flanges 14 thereof are preferably supported and shielded against the heat of the heat sealing jaws during the sealing operation and, for this purpose, a pair of shell confining members designated 25 and 25' are provided. In general, the shell confining members are shaped to provide a frame which will closely surround a respective one of the cup-like bodies 10 and 11 in the region adjacent the flange and, preferably, the side walls designated 41 of the shell confining members are shaped to closely surround the undistorted shell not only in the region adjacent the flange, but also at points spaced from the flange to provide a heat shield. The open ends of the shell confining members provide a lip portion arranged to engage the flange on the shell to enable clamping of the shell flanges between the adjacent shell confining members. The shell confining members are mounted for movement toward and away from each other and as herein shown are operated by linear actuators 47 and 47', it being understood that any other suitable mechanism may be provided for moving the shell confining members into and out of position around the container. The linear actuators 47 and 47' are mounted on generally U-shaped support brackets 48, 48' carried by the support plates 37 and 36 respectively. The actuators are similarly constructed and each includes a piston rod 49 connected through a crosshead 51 and rods 52 to platens 53, 53' which support respective ones of the shell confining members 25, 25'. In the embodiment shown, the linear actuators are of the single acting air operated type which are normally urged to their retracted position shown in FIG. 1 as by a spring (not shown) and which are urged to their extended position shown in FIG. 3 in response to the application of fluid pressure to pressure lines designated 55 and 55' respectively. As shown in FIGS. 1 and 3, the guide rods 52, 52' extend through guide bores 57 in the respective support plates and are laterally stabilized thereby.

The heating jaws 26 and 26' are dimensioned to extend around the respective shell confining members 25 and 25' and to engage and heat the flange portions outwardly of the shell confining members. The heating jaws shown herein comprise generally rectangular frames designated 65 and 65' having heating elements 66 therein. The heating jaws are supported on platens 67, 67' respectively, and the latter are conveniently guidably supported on the support rods 38. The heating jaws are also selectively moved toward and away from each other and, as shown, are operated by linear actuators 71, 71', it being understood that other suitable means may be provided for moving the heat sealing jaws. The linear actuators are herein shown supported on the support plates 37 and 36 and each includes a cylinder and piston rod 72 extending out of the cylinder and operatively connected to the respective one of the heating jaws. The actuators 71 and 71' are also conveniently of the single acting type which are normally urged to a retracted position as shown in FIG. 1, as by a spring (not shown) and are pressure operated to an extended position as shown in phantom in FIG. 3 in response to the application of fluid pressure to the lines 75 and 75'.

In order to prevent distortion of the thermoplastic bodies during heating of the flanges, provision is made for cooling the shell confining members to maintain the temperature of the thermoplastic bodies below the distortion temperature thereof during the heating operation. In the embodiment shown, the platens 53 and 53' are also adapted to function as cooling plates and are formed with coolant passages 91 therein adapted to have a cooling fluid such as water or the like pass therethrough to cool the shell confining members. Coolants such as water may be supplied to the passages 91 in any suitable manner and, as diagrammatically shown in FIG. 1, the passages are connected through conduits 92 to a coolant source 98. A thermostatically controlled apparatus (not shown) may be provided and operated in accordance with the temperature of the shell confining members to regulate the flow of coolant and maintain the temperature of the shell confining members below the heat distortion temperature of the thermoplastic to prevent heat distortion of the thermoplastic bodies during heat sealing. In order to inhibit buildup of the temperature in the structure associated with the heat sealing jaws, the latter are also preferably cooled and, as shown, are provided with coolant passages 96 connected through lines 97 to the coolant source 98 to have a cooling fluid pass therethrough. If desired, the coolant can be passed serially through the passages 91 in the shell confining members and then through the passages 96 in the heat sealing jaws. Any suitable means such as flexible or telescoping conduits may be provided for connecting the movable platens 53, 53' and 67, 67' to the coolant source.

The heating jaws 65, 65' are heated as by heaters 66, from a power source 83 under the control of thermostats 84, 84' (FIG. 1) which respond to the temperature of the heating jaws. In accordance with the present invention, the heating jaws are heated to an elevated temperature substantially above the melting temperature of the thermoplastic material, and preferably in the range 500°–1000° F. for thermoplastic materials such as polyethylene, and are arranged to engage the flanges 14 for a time sufficient to transfer enough heat to the overlapping marginal flanges on the thermoplastic bodies to raise the overlapping portions to a temperature above the melting temperature of the thermoplastic material, which is about 275° F. for high density polyethylene. The sealing jaws 27 are provided for thereafter pressing the heat softened overlapping edge portions into intimate sealing contact to seal and cool the same. The sealing jaws 27, 27' are dimensioned to extend around the thermoplastic bodies and in the form shown comprise generally rectangular frames designated 101 and 101' mounted on platens 102, 102'. The sealing jaws are selectively moved toward and away from each other and, as shown, are operated by linear actuators 103, 103' mounted on support plates 104, 104'. The support plate 104' is conveniently supported directly on the frame structure 35 and the other support plate 104 is shown in FIG. 1 mounted on the upper ends of rods or standards 105. The actuators 103, 103' are conveniently of the single acting type which are normally urged to a retracted position as shown in FIG. 1 by a spring (not shown) and are pressure operated to an extended position shown in FIG. 3 in response to the application of fluid pressure to the lines 107, 107'. The sealing jaws are also advantageously arranged to cool and set the heat sealed portions and, for this purpose, have coolant passages 108, 108' disposed in heat exchange relation thereto and connected as through lines 109, 109' to a coolant source 111. A means, such as a thermostat (not shown), may be provided for regulating the flow of coolant to maintain the temperature of the sealing jaws substantially below the softening temperature of the thermoplastic material so that the sealing jaws rapidly cool and set the heat softened portions on contact with the same.

The preformed thermoplastic bodies can be arranged in opposed relation and positioned between the shell confining members 25, 25', and the heated bodies can be transferred from the heating station to the sealing jaws 27, 27' in any desired manner, either manually or automatically. For example, the cup-like bodies can be arranged in opposed relation and then deposited in one or the other of the shell confining members, and the shell confining members then moved toward each other to enclose the thermoplastic bodies and finally grip the flanges therebetween, after which the heating jaws are closed to heat soften the flanges. The bodies can then be manually transferred to the sealing jaws 27, 27' which are then closed to seal and set the heated flanges. An automatic arrangement for assembling and transferring containers is disclosed in the copending application of Albert B. Mojonnier for "Packaging Apparatus," Ser. No. 557,941, filed June 16, 1966 and includes transfer mechanism indicated at 115 in FIG. 1 for advancing the preassembled shells to the heating station and for advancing the shells from the heating station to the sealing jaws 27, 27'. In general, the transfer mechanism, as disclosed more fully in the above mentioned application, has upper and lower shell engaging fingers 116 and 116' which engage the upper and lower shells adjacent the flanges and the transfer members are mounted and operated to move sequentially inwardly into gripping engagement with the upper and lower shells; longitudinally to advance the shells from one station to the next succeeding station, and then laterally outwardly to release the shells and back to their initial position. Stationary supports such as 118 and 119 may be provided for supporting the containers at the heating and sealing stations respectively when the jaws are retracted. As shown, the support platforms 118 and 119 are mounted on support rods 121' and 122' attached to the lower support plates 36 and 104'.

Any suitable mechanism may be provided for controlling operation of the shell confining members, the heating jaws and the sealing jaws in timed relation with each other and with the transfer mechanism 115, and to also control the duration of the heating cycle. An apparatus suitable for operating the several fluid actuators 47, 47', 71, 71' and 103, 103' is diagrammatically illustrated in FIG. 1. As diagrammatically shown, valves 121, 122 and 123 are respectively provided for controlling actuation of the shell confining members, the heating jaws and the sealing jaws, and a further valve 124 is provided for controlling the operation of a transfer mechanism actuating means diagrammatically indicated at 125. The valves are operated in timed relation with each other by a sequence control mechanism 126.

The valves 121–124 are conveniently of similar construction, and each has an inlet designated by the letter a, a pressure outlet b, an exhaust outlet c, and pilot control ports d and e. The valves are operative when pressure is relieved at the pilot control d to move the valve to a position communicating the pressure line b with the inlet a and operative when pressure is relieved at the pilot control e to move the valve to a position communicating the pressure outlet b with the exhaust outlet c. The inlets a of the valves are connected through regulators 131–134 to a pressure supply source indicated at 128.

The pressure outlet b of valve 121 is connected through a line 34 to the jaw operating cylinders 71, 71' and the valve 122 is connected through a line 135 to the operators 47, 47' for the shell confining members. Valve 123 is connected through a line 136 to the operators 103, 103' for the shaping jaws, and the valve 124 is connected to the transfer mechanism operator diagrammatically indicated at 125. The sequence control mechanism 126 is conveniently of the air operated type having an air operated motor 127 operable at a selectively adjustable speed to actuate the several pilot controls in times relation with each other. In general, the sequence control operates to sequentially close the shell confining members to grip the shell flanges therebetween; close the heating jaws for a preselected time interval sufficient to heat the projecting flanges to the desired temperature; open the heating jaws prior to opening of the shell confining members so that the shell confining members operate to strip the flanges from the heating jaws, and to thereafter open the shell confining members. The transfer mechanism is operated while the shell confining members are retracted and the transfer mechanism moves inwardly to engage the container and thereafter advance the same to the shaping station. The sealing jaws are closed on the heated flanges to seal and set the same. In practice, a pair of shells can be undergoing heating at the heating station while the flanges on a previously heated container are being sealed at the subsequent sealing station.

In order to effect reliable heat sealing of the overlapping portions of the thermoplastic bodies, sufficient heat must be transferred to the flanges at the heating station to raise the temperature of the flanges at the interface therebetween to a temperature above the melting temperature of the thermoplastic material. Thermoplastic material such as high density polyethylene has a melting temperature of about 275° F. and changes from a translucent to a generally transparent condition and becomes relatively soft and sealable when heated above that temperature. It has been found that the time required to heat the overlapping portions of the thermoplastic bodies to the desired sealing temperature can be markedly decreased by increasing the temperature of the heat sealing jaws and that, moreover, the problems encountered with sticking of the thermoplastic material to the heat sealing jaws, as occurs in the lower temperature ranges, can be effectively overcome by maintaining the heat sealing jaws at a temperature which is very high as compared to the sealing temperature of the thermoplastic material and such that the thermoplastic material melts rapidly upon contact with the heat sealing jaws. For example, it has been found that the time required to heat the thermoplastic polyethylene to the desired sealing temperature can be reduced by a factor of about three if the jaw temperature is raised from 300° F. to around 550° F. Moreover, while sticking problems are encountered at the lower temperature ranges between 300° and 450° F., it has been found that when the heat sealing jaws are heated to a relatively high temperature in the range between 500° and 600° F., any thermoplastic material which adheres to the jaws is rapidly melted and/or vaporized so that the thermoplastic material does not stick or accumulate on the jaws. Thus, it has been found that when the jaws are heated to these elevated temperatures, plain polished jaws can be used without sticking or accumulation of plastic, provided they are of a material such as stainless steel which does not oxidize or corrode readily, or are plated and polished to provide a smooth non-oxidizing surface.

It has further been found that heating of the flanges to the desired melting or sealing temperature does not have to be effected in a single continuous operation, and that somewhat improved results can be achieved by engaging and releasing the heating jaws from the overlapping portions two or more times, with the duration of each of the plural engagements or "pats" of the heating jaws against the overlapping edge portions of substantially shorter duration than that employed in a single continuous heating operation. The successive engagements or "pats" on the heating jaws can be achieved at a single station by opening and closing the jaws several times or, preferably, the heating can be effected at successive stations as shown in FIG. 9 so as to increase the rate at which the containers can be heat sealed. As used herein, the term effective heating time refers to the total time the hot jaws engage the flanges, whether in one, two or more sequential "pats" or engagements of the hot jaws with the flanges. The heating apparatus as shown in FIG. 9 has heating jaws 26, 26' and shaping jaws 27, 27' the same as that previously described and like numerals are used to designate the same parts. The sealing apparatus of FIG. 9 also has an additional set of heating jaws and like numerals followed by the subscript "a" are used to designate parts corresponding to the previously described heating jaws. As pointed out herein, additional heating jaws could be provided, if desired. Representative examples of the times for heating two flanges of high density polyethylene, particularly the product designated DCDA 3452 of the Union Carbide Plastics Company division of Union Carbide Corporation, 270 Park Avenue, New York, N.Y., at different jaw temperatures and employing one "pat," two "pats" and three "pats" of the heating jaws, are given in the following tables. This particular high density polyethylene has a density of .980 (ASTM Test D–1605) and a melt index of .13–.26 (ASTM Test D–1238). The first table is for this high density polyethylene in which each flange portion has a thickness of the order of .020 inch and the second table is for this polyethylene in which each flange portion has a thickness of the order of .030 inch. The times indicated in the columns labelled "2 Pats" and "3 Pats" represent the time duration in seconds of each engagement or "pat" of the heating jaws with the overlapping edge portions so that the total or effective heating time for the two "pat" operation would be twice the time indicated and the total heating time for the three "pat" operation would be three times the time indicated in that column.

TIMES FOR HEATING TWO FLANGES OF POLYETHYLENE EACH .020" THICK AT 200 P.S.I. PRESSURE

| Sealing jaw temp., °F. | 1 pat (secs.) | 2 pats (secs.) | 3 pats (secs.) |
| --- | --- | --- | --- |
| 300 | 3.0 | 1.5 | 0.8 |
| 350 | 2.0 | 1.0 | 0.5 |
| 400 | 1.5 | 0.8 | 0.5 |
| 450 | 1.5 | 0.5 | 0.4 |
| 500 | 1.2 | 0.5 | 0.3 |
| 550 | 1.0 | 0.4 | 0.2 |
| 600 | 0.8 | 0.3 | 0.1 |
| 650 | 0.7 | 0.3 | 0.1 |

TIMES FOR HEATING TWO FLANGES OF POLYETHYLENE EACH .030" THICK AT 200 P.S.I. PRESSURE

| Sealing jaw temp., °F. | 1 pat (secs.) | 2 pats (secs.) | 3 pats (secs.) |
| --- | --- | --- | --- |
| 300 | 4.5 | 2.5 | 2.0 |
| 350 | 3.5 | 1.8 | 1.1 |
| 400 | 2.7 | 1.3 | 0.8 |
| 450 | 2.1 | 0.9 | 0.6 |
| 500 | 1.8 | 0.8 | 0.4 |
| 550 | 1.5 | 0.6 | 0.3 |
| 600 | 1.3 | 0.5 | 0.3 |
| 650 | 1.3 | 0.5 | 0.3 |

As will be seen, the heating time required for heating the overlapping edge portions in a single continuous operation, indicated in the columns labelled "1 Pat" decreases markedly with increasing jaw temperature and that, in the temperature range around 550° F. the heating time is reduced to approximately one-third the time required at the 300° jaw temperature. It will further be noted that, particularly at the higher jaw temperatures, the total or effective heating time for the "2 Pat" and "3 Pat" operations is significantly less than that required in a single pat operation. While the times indicated in the columns labelled "2 Pats" and "3 Pats" do not include the time necessary for transferring the containers from one station to the other, it has been found that this transfer time is not critical as regards the heat sealing operation, so long as the successive pats are effected within a reasonable index time, for example, no more than .5 to 1.0 second. It is considered that the shorter total or effective heating time for the multiple pat heating is due to the low thermal conductivity of polyethylene. Heat applied to the flanges by the hot jaws at the first pat continues to be conducted through the thickness of the material toward the mating flange faces when the jaws are disengaged from the flanges so that heating of the mating surfaces of the flanges to the desired melting or sealing temperature can be achieved with an overall shorter heating time, if the heating is done with successive "pats" on the outer faces of the flanges.

The use of the high jaw operating temperatures not only reduces the heat sealing time, but also provides an improved heat sealed joint, even when the flanges or overlapping edge portions are not of uniform thickness. At the high jaw operating temperatures (above 500° F. for polyethylene), the hot jaws rapidly melt the outer surfaces of the overlapping edge portions and thus equalize any non-uniformity in the flange thickness, as shown in FIG. 5. Moreover, at these high jaw temperatures, any thermoplastic material that does adhere to the heating jaws melts and/or vaporizes rapidly and in less time than that required to complete a heating cycle so that there is no accumulation of thermoplastic on the jaws. As will be seen from the tables of heating times, the rate of change of heating time with changes in jaw temperatures diminishes at the higher sealing temperatures above 500° F. In practice, this enables the heating time to be preset for successive cycles according to the median temperature of the heating jaws and even moderate changes in heating time or jaw temperature from this median will not significantly affect proper heating of the flanges. Because of the rapid melting of the outer surfaces contacted by the heating jaws, a stop means 30 is provided for limiting closing movement of the heating jaws, which stop means is selected so as to stop the jaws when they are spaced apart a distance slightly less than the combined thickness of the overlapping portions. For example, when sealing the flanges of the .020" thick polyethylene, the stop clearance was selected at .030" which is approximately .010" less than the combined thickness of the flanges. Similarly, for the .030" thick polyethylene flanges, the stop clearance was selected at .050" which is also approximately .010" less than the combined thickness of the flanges. By reason of the rapid melting of the outer surfaces and the provision of stops for limiting closing movement of the jaws, it will be seen that the pressure applied to the flanges by the heating jaws drops to a very low value or almost zero when the jaws engage the stop. The pressure applied to close the heating jaws is therefore not critical, so long as it is sufficient to press the jaws against the flanges and allow the hot jaws to melt the outer surfaces of the same.

When the flanges are heated to the elevated temperatures substantially above the melting temperatures, the flanges are in a very soft condition and the flanges tend to shrink in the plane of the flanges and produce some lateral thickening of the same, as shown in FIG. 6. The heat softened flanges are thereafter sealed in the sealing jaws by the application of pressure to opposite sides of the heat softened flanges sufficient to press the heat softened flanges into intimate contact. The pressure used at the sealing station can be varied over wide limits dependent somewhat on the temperature maintained at the heating jaws and the amount of reshaping required in the flanges. Relatively low sealing pressures of the order of 2–6 p.s.i. on the flanges can be used at the sealing station if the sealing jaws are shaped so as to only engage the portions of the flanges that are contacted by the heating jaws. If more reshaping is desired, for example if it is desired to shape not only the portion of the flanges directly engaged by the heating jaws but also the somewhat cooler portions immediately adjacent thereto, the sealing jaws can be shaped accordingly and somewhat higher pressures used in closing the sealing jaws to flatten or shape the flanges. The sealing jaws can be configured to impart the desired shape to the flanges and may, for example, be beveled as shown at 101c in FIG. 8 to reshape the heat softened flanges to a wedge shaped configuration. The sealing jaws are advantageously cooled so as to also cool and set the heat softened flanges and prevent subsequent separation of the flanges due to the stresses in the thermoplastic bodies. Alternatively, the sealing jaws can have a different configuration to impart a different shape to the flanges if desired. A modified form of sealing jaw is illustrated in FIG. 7 and includes resilient dams 101d of rubber or the like in the jaws which confine the heat softened flanges against outward flow, and which resilient dams are compressible as the sealing jaws are closed so that the heat softened material can be compression molded to conform to the shape of the sealing jaws inwardly of the dams.

What is claimed as new is:

1. An improved method of forming containers from two hollow thermoplastic polyethylene bodies having marginal flange portions in overlapping engagement comprising, heating the overlapping marginal flange portions by engaging and thereafter disengaging the outer faces of the flange portions at least twice in succession between heating jaws heated to a temperature above the heat softening temperature of the thermoplastic bodies for a combined time of successive engagements sufficient to transfer enough heat to the overlapping flange portions to raise the temperature at the abutting faces thereof above the minimum temperature at which the flange portions of the thermoplastic bodies can be heat sealed, holding the flange portions in abutting relation by engagement with the bodies adjacent the inner edge of the flange portions while disengaging the heating jaws from the flange portions, and thereafter sealing and cooling the flanges by clamping the heated portions of the flanges between cooling jaws with sufficient pressure to bring the heated flange portions into intimate contact.

2. An improved method of forming containers according to claim 1 wherein the successive engagements of the flange portions between heating jaws is effected at different heating stations and the sealing of the marginal flange portions is effected at a cooling station, and the containers are transferred from one heating station to another and then to the cooling station.

3. An improved method of forming containers according to claim 1 wherein the flange portions are heated by engaging and thereafter disengaging the same three times in succession between heating jaws.

4. The method of claim 1 wherein the heating jaws are heated to a temperature in the range of 500°–1000° F.

5. The method of claim 1 wherein the heating jaws are heated to a temperature in the range of 550°–800° F.

6. An improved method of forming containers from two hollow thermoplastic polyethylene bodies having marginal flange portions comprising, transferring the two hollow bodies with the flange portions in abutting relation sequentially past at least first and second heating stations and a cooling station, heating the marginal flange portions of a container in successive stages by engaging and thereafter disengaging the outer faces of the flange portions at each heating station between heating jaws heated to a temperature above the heat softening temperature of the thermoplastic bodies for a combined time of successive engagements sufficient to transfer enough heat to the overlapping flange portions to raise the temperature at the abutting faces thereof above the minimum temperature at which the flange portions of the thermoplastic bodies can be heat sealed, and thereafter sealing and cooling the flanges at the cooling station by clamping the heated portions of the flanges between cooling jaws with sufficient pressure to bring the heated flange portions into intimate contact.

References Cited

UNITED STATES PATENTS

| | | | |
|---|---|---|---|
| 2,825,194 | 3/1958 | Page | 156—69UX |
| 3,050,916 | 8/1962 | Gausman et al. | 156—311UX |
| 3,063,890 | 11/1962 | Saumsiegle | 156—306 |
| 3,102,182 | 8/1963 | Oelze et al. | 156—583 |
| 3,152,944 | 10/1964 | Mojonnier et al. | 156—498 |
| 3,162,564 | 12/1964 | Buchner | 156—583 |
| 3,293,099 | 12/1966 | Stark | 156—311 |
| 3,372,081 | 3/1968 | Hurschman | 156—69X |
| 3,272,674 | 9/1966 | Sachs et al. | 156—282 |
| 3,379,595 | 4/1968 | Bracey | 156—306 |
| 3,056,712 | 10/1962 | Imhof | 156—306 |
| 3,177,106 | 4/1965 | Seefluth et al. | 156—306 |
| 3,439,590 | 4/1969 | Rosenberg et al. | 156—311 |

HAROLD ANSHER, Primary Examiner

W. E. HOAG, Assistant Examiner

U.S. Cl. X.R.

156—306, 311